(12) United States Patent
Zhang et al.

(10) Patent No.: US 11,630,790 B1
(45) Date of Patent: Apr. 18, 2023

(54) INTEGRATED CIRCUIT AND INTERRUPT-HANDLING METHOD OF SENSING DEVICE

(71) Applicant: MediaTek Singapore Pte. Ltd., Singapore (SG)

(72) Inventors: Hui Zhang, Beijing (CN); Peng Zhou, Beijing (CN); Shi Ma, Beijing (CN); Fei Yin, Hefei Anhui (CN); Wulin Li, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/666,978

(22) Filed: Feb. 8, 2022

(30) Foreign Application Priority Data

Jan. 18, 2022 (CN) .......................... 202210057340.2

(51) Int. Cl.
| | |
|---|---|
| *G06F 13/00* | (2006.01) |
| *G06F 3/06* | (2006.01) |
| *G06F 13/24* | (2006.01) |
| *G06F 13/22* | (2006.01) |
| *G06F 13/28* | (2006.01) |
| *G06F 9/48* | (2006.01) |
| *G06F 9/30* | (2018.01) |
| *G06F 13/42* | (2006.01) |

(52) U.S. Cl.
CPC ............ *G06F 13/24* (2013.01); *G06F 9/3004* (2013.01); *G06F 9/30101* (2013.01); *G06F 9/4881* (2013.01); *G06F 13/22* (2013.01); *G06F 13/28* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 7,831,979 | B2 * | 11/2010 | Whalen ............... | G06F 9/30054 718/108 |
| 11,252,070 | B2 * | 2/2022 | Wang ................... | H04L 43/0817 |
| 11,526,284 | B2 * | 12/2022 | Patel ..................... | G06F 3/0629 |

(Continued)

OTHER PUBLICATIONS

Maquelin et al., "Polling Watchdog: Combining Polling and Interrupts for Efficient Message Handling", 1996, McGill University (Year: 1996).*

*Primary Examiner* — Hyun Nam
(74) *Attorney, Agent, or Firm* — McClure, Qualey & Rodack, LLP (57) ABSTRACT

An integrated circuit is provided, which includes: a processor, a general interrupt controller, and a bus master. The bus master includes: a bus-control circuit and a polling circuit, which is configured to detect whether an interrupt signal of the sensing device is asserted. In response to the polling circuit detecting that the interrupt signal is asserted, the bus-control circuits fetches each task stored in a task queue of a memory in sequence, and performs one or more data-transfer operations corresponding to each task to obtain sensor data from the sensing device. In response to a task-completion signal of the tasks generated by the bus-control circuit, the general interrupt controller generates an interrupt request signal. In response to the interrupt request signal, the processor reports a sensor event using the sensor data obtained by the data-transfer operations corresponding to each task.

18 Claims, 9 Drawing Sheets

(56) References Cited

U.S. PATENT DOCUMENTS

| | | | |
|---|---|---|---|
| 11,526,291 B2* | 12/2022 | Cai | G06F 3/0685 |
| 2005/0257224 A1* | 11/2005 | Whalen | G06F 9/30076 |
| | | | 712/E9.032 |
| 2008/0180450 A1* | 7/2008 | Dowling | G06F 15/7839 |
| | | | 712/E9.054 |
| 2009/0193234 A1* | 7/2009 | Ors | G06F 9/4881 |
| | | | 712/E9.016 |
| 2020/0034320 A1* | 1/2020 | Mallela | G06F 13/32 |
| 2022/0083485 A1* | 3/2022 | Hantz | H04B 7/1851 |
| 2022/0179813 A1* | 6/2022 | Nakatani | G06F 13/28 |

* cited by examiner

INTEGRATED CIRCUIT AND INTERRUPT-HANDLING METHOD OF SENSING DEVICE

CROSS REFERENCE TO RELATED APPLICATIONS

This application claims priority of China Patent Application No. 202210057340.2, filed on Jan. 18, 2022, the entirety of which is incorporated by reference herein.

BACKGROUND OF THE INVENTION

Field of the Invention

The present invention relates to an input device, and, in particular, to an integrated circuit and an interrupt-handling method of a sensing device.

Description of the Related Art

Currently, sensing devices, which may include touch-control pads, touch screens, sensors of different types (e.g., gyroscope, accelerometer, etc.), are often used to control an electronic device. With advent in technologies, given that the sensing device is a touch screen, the report rate of the sensing device is getting higher and higher, e.g., from 60 Hz to 480 Hz or higher. Although a user may perceive smoother touch operations when a higher report rate is used by the sensing device, it may also increase the loading of the processing unit (e.g., CPU) of the electronic device. Specifically, if the report rate of the sensing device is high enough, it may cause a serious burden to the processing unit, resulting in a lower performance of the electronic device.

Accordingly, there is demand for an integrated circuit and a method for controlling an integrated circuit and an interrupt-handling method of a sensing device to solve the aforementioned problem.

BRIEF SUMMARY OF THE INVENTION

An embodiment of the present invention provides an integrated circuit, which includes: a processor, a general interrupt controller, and a bus master. The bus master comprises: a bus-control circuit and a polling circuit, which is configured to detect whether an interrupt signal of the sensing device is asserted. In response to the polling circuit detecting that the interrupt signal is asserted, the bus-control circuits fetches each task of a plurality of tasks stored in a task queue of a memory in sequence, and performs data-transfer operations corresponding to each task to obtain sensor data from the sensing device. In response to a task-completion signal generated by the bus-control circuit, the general interrupt controller generates an interrupt request signal. In response to the interrupt request signal, the processor reports a sensor event using the sensor data obtained by the data-transfer operations corresponding to each task.

In some embodiments, the bus-control circuit is performing the data-transfer operations corresponding to each task, the polling circuit is disabled. The polling circuit is enabled in response to the task-completion signal.

In some embodiments, the bus master further comprises a DMA (direct memory access) controller, configured to fetch each task from the memory.

In some embodiments, the bus master further comprises a first register and a second register, wherein a first value stored in the first register represents a hardware task count, and a second value stored in the second register represents a base physical address of the task queue.

In some embodiments, the bus master further comprises a third register and a fourth register, wherein the processor writes the tasks in the task queue and writes the first value of the first register and second value of the second register when the integrated circuit is booted up, and sets a third value of the third register to 1 when the processor has completed writing. In response to the third value of the third register being set to 1, the bus-control circuit starts to fetch the tasks from the task queue in sequence using the first value of the first register and the second value of the second register. A fourth value stored in the fourth register is used to enable or disable hardware functions of polling and data transferring of the bus master.

In some embodiments, in response to the task queue being empty, the bus-controller circuit writes the third value of the third register to 0, and the processor starts to write new tasks to the task queue in response to the third value of the third register being set to 0.

In some embodiments, the processor reports the sensor event to an application running on the processor, and the application executes one or more operations corresponding to the reported sensor event.

In some embodiments, the bus-control circuit is connected to the sensing device through a SPI (serial peripheral interface) bus, an I2C (inter-integrated circuit) bus, or an I3C bus.

Another embodiment of the present invention provides an interrupt-handling method of a sensing device, for use in an integrated circuit. The integrated circuit comprises a processor, a general interrupt controller, and a bus master. The bus master comprises a bus-control circuit and a polling circuit. The method includes the following steps: utilizing the polling circuit to detect whether an interrupt signal of the sensing device is asserted; in response to the polling circuit detecting that the interrupt signal is asserted, utilizing the bus-control circuit to fetch each task of a plurality of tasks stored in a memory in sequence, and to perform data-transfer operations corresponding to each task to obtain sensor data detected by the one or more sensors from the sensing device; in response to a task-completion signal of the tasks generated by the bus-control circuit, utilizing the general interrupt controller to transmit an interrupt request signal to the processor; in response to the interrupt request signal, utilizing the processor to report a sensor event using the sensor data obtained by the data-transfer operations corresponding to each task.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The following description is presented to enable one of ordinary skill in the art to make and use the invention, and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Figure 1:
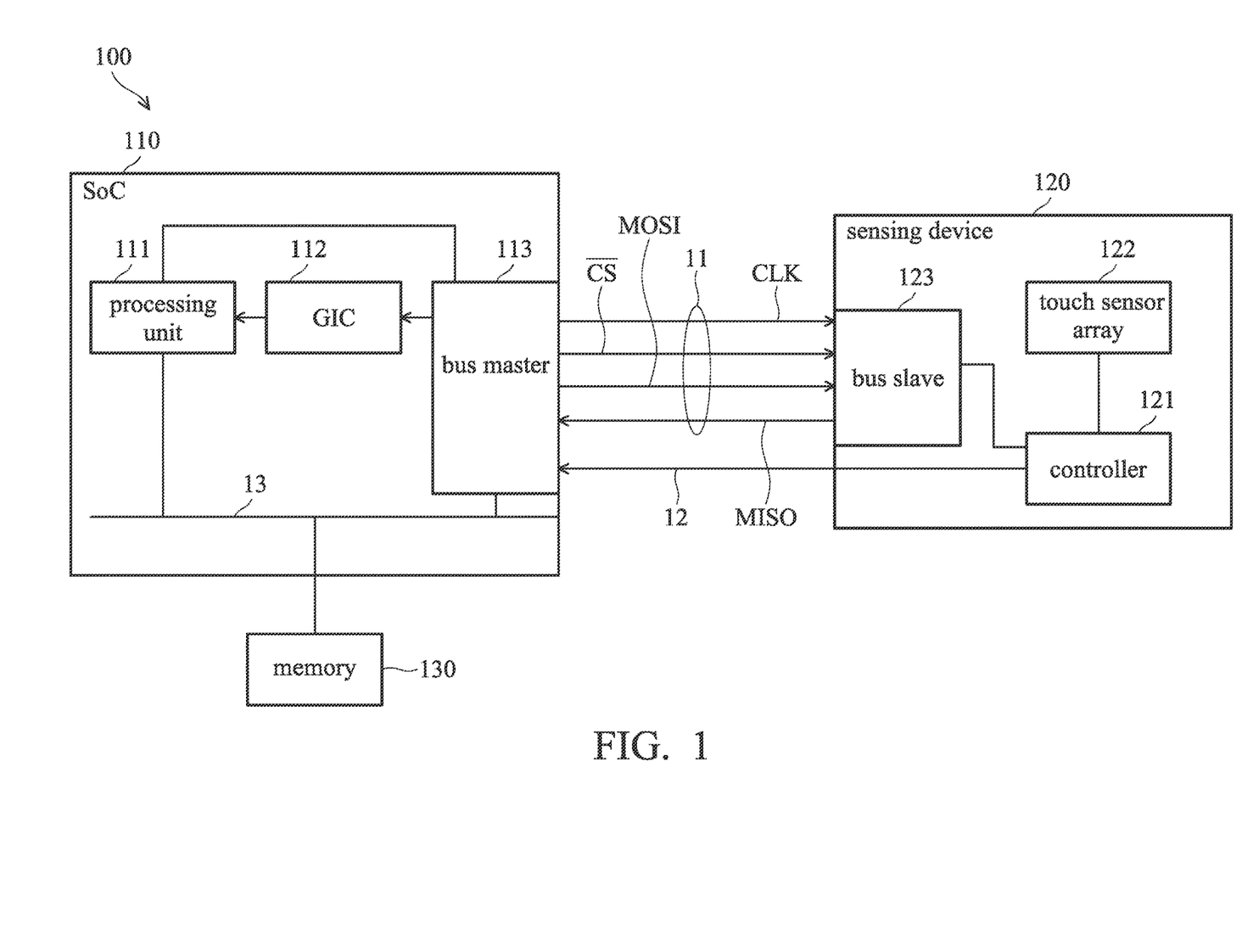
FIG. 1 is a diagram of an electronic device in accordance with an embodiment of the invention.

FIG. 1 is a diagram of an electronic device in accordance with an embodiment of the invention.

The electronic device 100 may be a laptop computer, a tablet PC, a smartphone, a touch panel, etc. As shown in FIG. 1, the electronic device 100 may include a system-on-chip (SoC) 110, a sensing device 120, and a memory 130. The SoC 110 may be connected to the sensing device 120 through bus 11, and be connected to the memory 130 through bus 13. The sensing device 120 may be a device equipped with different types of sensors, such as touch sensors, inertial measurement sensors (e.g., gyroscope, accelerometer, and magnetometer), temperature sensors, pressure sensors, light sensors, proximity sensors, ultrasonic sensors, etc., but the invention is not limited thereto.

The memory 130 may be a volatile memory, such as a static random access memory (SRAM) or a dynamic random access memory (DRAM), or a non-volatile memory, such as a flash memory, but the invention is not limited thereto. The memory 130 may be configured to store programs that are executed by the processing unit 111, and store tasks generated by the executed programs, where a portion of the tasks may use the bus master 113 to transmit data to and receive data from the sensing device 120.

The SoC 110 may include a processing unit 111, a general interrupt controller (GIC) 112, and a bus master 113. The processing unit 111 may be implemented by a central processing unit (CPU), a microcontroller, or a digital-signal processor (DSP), but the invention is not limited thereto. The processing unit 111 may transmit setting information about the sensing device 120 to the bus master 113, and the bus master 113 may transmit the setting information to the sensing device 120 through bus 11.

The general interrupt controller 112 may be an exclusive hardware circuit that performs critical tasks of interrupt management, prioritization and routing, which is capable of boosting the efficiency of the processing unit 110 and supporting interrupt virtualization.

The bus master 113 may send control signals to the bus slave 123, which is included in the sensing device 120, through bus 11, where bus 11 may be implemented by an SPI (serial peripheral interface) bus, an I2C (inter-integrated circuit) bus, or an I3C bus, but the invention is not limited thereto. For ease of description, in the following embodiments, bus 11 is implemented by the SPI bus, and the sensing device 120 is implemented by a touch screen.

Given that the sensing device 120 is a touch screen, the sensing device 120 may include a controller 121, a touch sensor array 122, and a bus slave 123. The touch sensor array 122 may be used to detect touch operations performed on it. The controller 121 may be implemented by a microcontroller, a general-purpose processor, or a digital-signal processor, but the invention is not limited thereto. In some embodiments, the touch sensor array 122 may be implemented by a capacitive sensor array, a resistive sensor array, or an optical imaging sensor array, but the invention is not limited thereto.

The bus slave 123 is a slave interface of bus 11. For example, given that bus 11 is implemented by the SPI bus, the bus master 113 may transmit a clock signal CLK, a chip-select ($\overline{CS}$) signal, a MOSI (master-out slave-in) signal to the bus slave 123, and receive a MISO (master-in slave-out) signal from the bus slave 123. In addition, the bus master may also receive a slave-data synchronization signal 12 from the controller 121 of the sensing device 120.

In an embodiment, when a user performs touch operations on the sensing device 120, the touch sensor array 122 may detect these touch operations and send detected touch signals to the controller 121, and the controller 121 may generate the slave-data synchronization signal 12 in response to the detected touch signals. In this case, the slave-data synchronization signal 12 can be regarded as a touch EINT signal (i.e., a touch interrupt signal).

In some other embodiments, the sensing device 120 may be a device other than the touch screen, and the touch sensor array 122 may be replaced by sensors of other types, such as a gyroscope, an accelerometer, a magnetometer, etc., but the invention is not limited thereto.

Figure 2A:
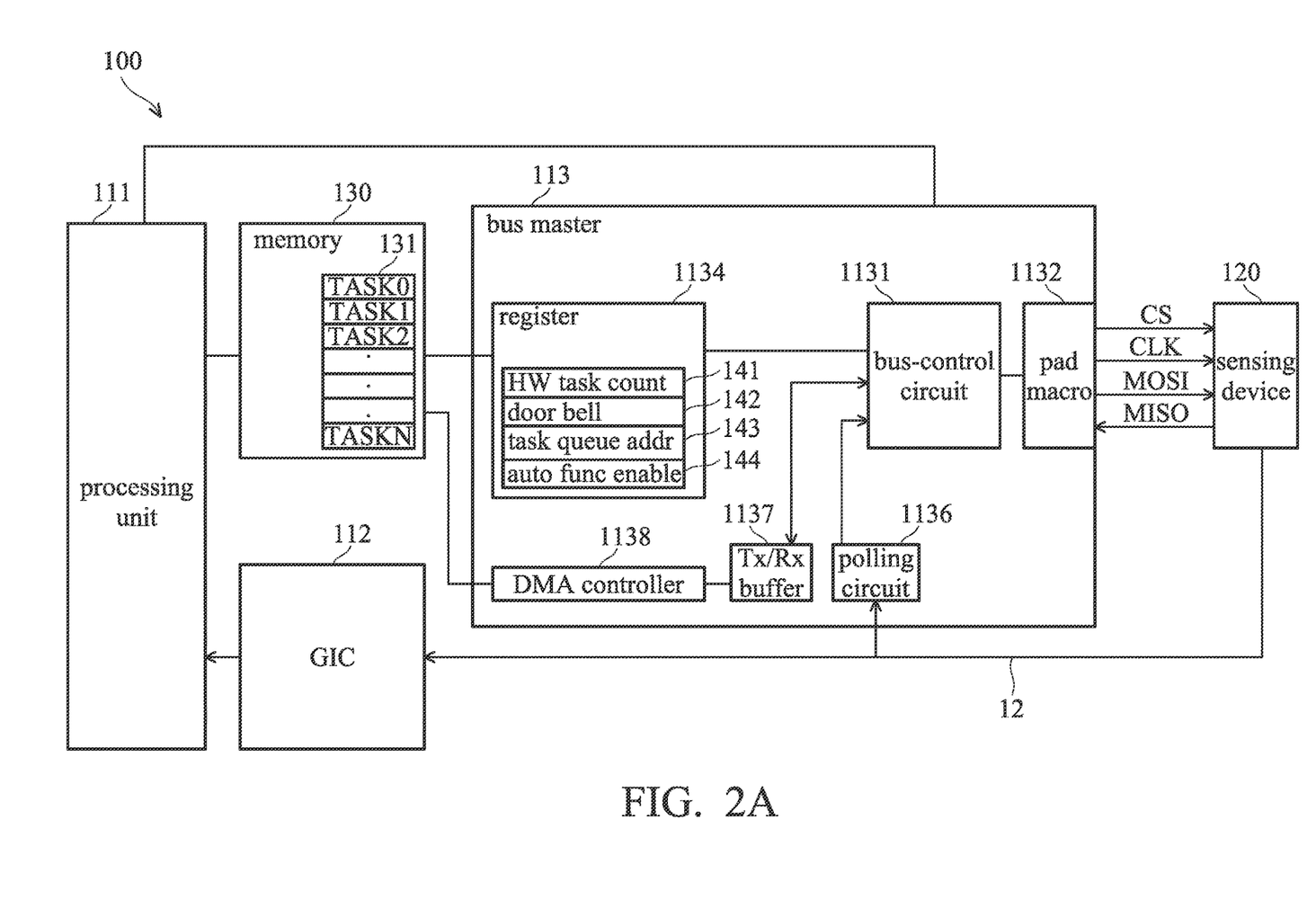
FIG. 2A is a detailed block diagram of the electronic device in accordance with the embodiment of FIG. 1.
Figure 2B:
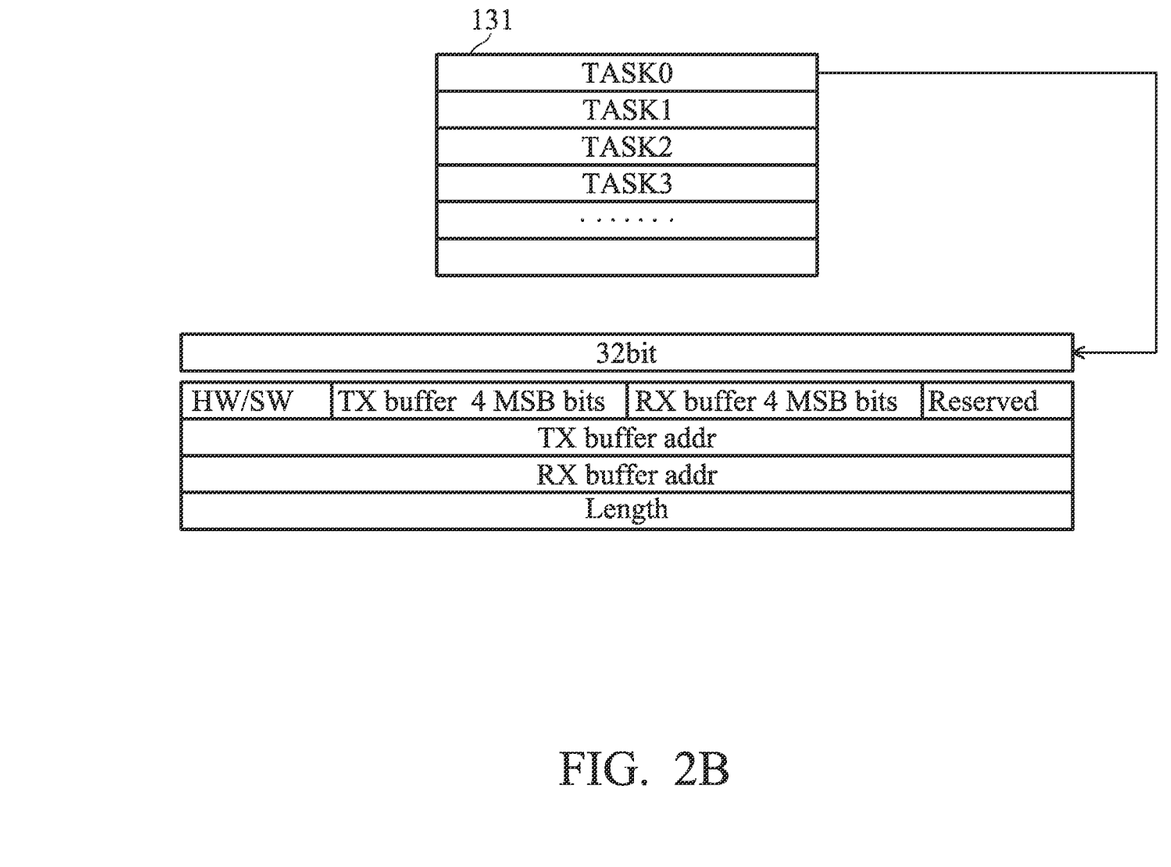
FIG. 2B is a diagram of the format of tasks stored in the memory in accordance with an embodiment of the invention.

FIG. 2A is a detailed block diagram of the electronic device in accordance with the embodiment of FIG. 1. FIG. 2B is a diagram of the format of tasks stored in the memory in accordance with an embodiment of the invention. Please refer to FIG. 1 and FIGS. 2A-2B.

As shown in FIG. 2A, the bus master 113 may include a bus-control circuit 1131, a pad macro 1132, registers 1134, a polling circuit 1136, a Tx/Rx buffer 1137, and a DMA (direct memory access) controller 1138. Given that the bus 11 is implemented by the SPI bus, the bus master 113 and the bus slave 123 can be regarded as an SPI master and an SPI slave, respectively. The bus-control circuit 1131 may be a legacy SPI master circuit which is capable of transmitting the clock signal CLK, chip-select signal $\overline{CS}$, and data signal MOSI to the bus slave 123 of the sensing device 120 through the pad macro 1132, and receiving the data signal MISO from the bus slave 123 of the sensing device 120 through the pad macro 1132. One having ordinary skill in the art will appreciate the operations of the bus-control circuit 1131, and thus the details will be omitted here.

The polling circuit 1136 may be configured to detect whether the slave data synchronization signal 12 (i.e., the touch EINT pin of the sensing device 120) is asserted according to the values in the register 141 to 144. For example, when the polling circuit 1136 detects that the slave data synchronization signal is asserted (e.g., may be from a low-logic state to a high-logic state, or from a high-logic state to a low-logic state, depending on the circuit design), the polling circuit 1136 may inform the bus-control circuit 1131 about the interrupt event, and the bus-control circuit 1131 may initiate a data-transfer operation over bus 11 to send data to the bus slave 123 and to receive sensor data detected by the touch sensor array 122 from the bus slave 123. It should be noted that the processing unit 111 (i.e., software) is not involved in the data-transfer operation initiated by the bus-control circuit 1131. Meanwhile, the polling circuit 1136 is temporarily disabled to stop monitoring the slave data synchronization signal 12 generated by the sensing device 120 during the data-transfer operation. Upon completion of the data-transfer operation, the polling circuit 1136 is enabled to continue monitoring the slave data synchronization signal 12 generated by the sensing device 120.

For example, the registers 141 and 143 are used for fetching the hardware tasks from the task queue 131 in the memory 130 by the bus-control circuit 1131. The register 141 may define the hardware task count (i.e., number of hardware tasks), and the register 143 may be used as a pointer of the base physical address of the task queue. For example, when the electronic device 100 is booted up, the processing unit 111 may write the register 143 with the base physical address of the task queue 131, and write the register 141 with the required hardware task count. When the polling circuit 1136 detects that the slave data synchronization signal 12 is asserted, the bus-control circuit 1131 may fetch, via the DMA controller 1138 through bus 13 (e.g., an advanced high performance (AHB) bus, or other high-speed bus), the number of tasks from the task queue 131 in the memory 130 with reference to the values stored in the registers 141 and 143, and the fetched tasks will be automatically executed by the bus-control circuit 1131, which can be regarded as hardware tasks.

In this case, given that the hardware task count stored in the register 141 is 2 and the base physical address stored in the register 143 is 1, the bus-control circuit 1131 may fetch two tasks from index 1 of the task queue 131 in the memory 130, such as task 1 and task 2 in the task queue 131 in sequence. In addition, the remaining tasks in the task queue 131 (e.g., task 3 to task N) will be performed by the processing unit 111, which can be regarded as software tasks.

The register 142 may be used as a doorbell register for triggering the bus-control circuit 1131 to perform software tasks. For example, after the processing unit 111 has stored tasks in the task queue 131, the processing unit 111 may set the value of the register 142 in the form of a bitmap. In response to the value of the register 142 being in the form of a bitmap, the bus-control circuit 1131 may start to fetch each task from the task queue 131 in sequence according to the values stored in the registers 141 and 143, and perform each fetched task to transmit data to the sensing device 120. In addition, after the bus-control circuit 1131 has fetched all tasks stored in the task queue 131, the task queue 131 becomes empty, and the bus-control circuit 1131 may write the value of register 142 to 0 to inform the processing unit 111 to fill tasks into the task queue 131.

In the present invention, the doorbell register is used to trigger a software task, and the touch EINT signal is used to trigger a hardware task. After the bus control circuit 1131 has completed the software task, because the software task is written by the user, the software task will be automatically cleared. However, after the bus control circuit 1131 has completed the hardware task, because the hardware task is automatically sent when the touch EINT signal arrives, the hardware task will not be cleared, and it must be cleared or modified manually. In addition, the doorbell register is implemented in the form of a bitmap, where each bit corresponds to a software task. For example, if the user needs to transmit two software tasks, and they are placed in the second and third positions (i.e., third and fourth bits) of the task queue respectively, then the user may write the value of 4'b1100 into the doorbell register, and the bus control circuit 1131 can find the corresponding software task according to the value of the doorbell register. Differently, the hardware task should be placed at the beginning of the task queue, for example, two hardware tasks should be placed in the first two positions (i.e., first and second bits) of the task queue. The bus control circuit 1131 can start processing hardware tasks from the beginning of the task queue, where the number of hardware tasks is the value of the hardware task count register.

The register 144 may be used to enable and disable the hardware functions of the bus master 113, such as polling and setting task queue. For example, if the value of the register 144 is set to 0, the hardware functions of the bus master 113 are disabled. If the value of the register is set to 1, the hardware functions of the bus master 113 are enabled.

In some implementations, the slave data synchronization signal 12 is not directly sent to the general interrupt controller 112, and the polling circuit 1136 may include a switch circuit (not shown in FIG. 2A) to control whether to bypass the slave data synchronization signal 12 to the general interrupt controller 112. For example, the switch circuit may be controlled by the value stored in the register 144. If the hardware functions of the bus master 113 are disabled (e.g., register 144 is set to 0), the switch circuit may bypass the slave data synchronization signal 12 to the general interrupt controller 112. If the hardware functions of the bus master 113 are enabled (e.g., register 144 is set to 1), the switch circuit will not bypass the slave data synchronization signal 12 to the general interrupt controller 112.

In an embodiment, given that bus 11 is implemented by the SPI bus and the bus width of bus 13 (e.g., an advanced high performance (AHB) bus) is 32 bit, the format of the each task stored in the memory 130 is shown in FIG. 2B. For example, each task may include 128-bit data, and the first 32-bit data may include the setting of hardware or software, 4 MSB bits of the Tx buffer, 4 MSB bits of the Rx buffer, and a reserved field. The second 32-bit data may refer to the address of the Tx buffer, and the third 32-bit data may refer to the address of the Rx buffer. The fourth 32-bit data may refer to the length of data to be transmitted to the sensing device 120. The aforementioned Tx buffer and Rx buffer can be collectively regarded as the Tx/Rx buffer 1137, which can be implemented by a FIFO (first-in first-out) buffer.

Figure 3A:
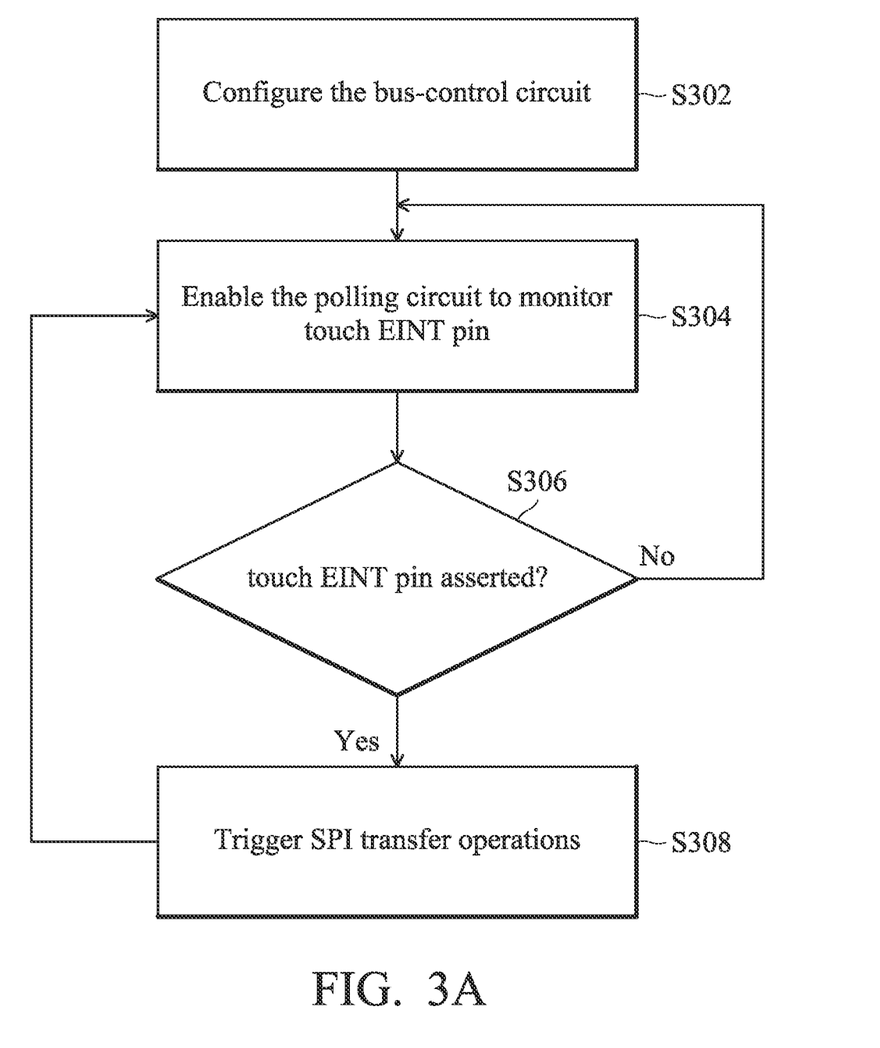
FIG. 3A is a flow chart of the workflow of the polling circuit in accordance with an embodiment of the invention.

FIG. 3A is a flow chart of the workflow of the polling circuit in accordance with an embodiment of the invention. Please refer to FIG. 1, FIGS. 2A-2B, and FIG. 3A.

In step S302, parameters of the bus-control circuit 1131 is configured. For example, the parameters of the bus-control circuit 1131 may include a data length, a buffer address, and a transfer count. Specifically, the hardware task count is stored in the register 141, the buffer address and data length of each hardware task are set, and they are written into the task time slot corresponding to the task queue, and the physical base address of the task queue is written into register 143.

In step S304, the polling circuit 1136 is enabled to monitor the slave data synchronization signal 12 (e.g., touch EINT pin) from the sensing device 120. For example, when a user performs touch operations on the sensing device 120, the touch sensor array 122 may detect these touch operations and send detected touch signals to the controller 121, and the controller 121 may generate the slave-data synchronization signal 12 in response to the detected touch signals. In this case, the slave-data synchronization signal 12 can be regarded as a touch EINT signal (i.e., a touch interrupt signal).

In step S306, it is determined whether the slave data synchronization signal 12 (e.g., touch EINT pin) is asserted. If it is determined that the slave data synchronization signal 12 (e.g., touch EINT pin) is asserted, step S308 is performed. If it is determined that the slave data synchronization signal 12 (e.g., touch EINT pin) is not asserted, the flow goes back to step S304. For example, when the polling circuit 1136 detects that the slave data synchronization signal is asserted (e.g., may be from a low-logic state to a high-logic state, or from a high-logic state to a low-logic state, depending on the circuit design), the polling circuit 1136 may inform the bus-control circuit 1131 about the interrupt event, and the bus-control circuit 1131 may initiate a data-transfer operation over bus 11 to send data to the bus slave 123 and to receive sensor data detected by the touch sensor array 122 from the bus slave 123. Meanwhile, the polling circuit 1136 is temporarily disabled to stop monitoring the slave data synchronization signal 12 generated by the sensing device 120 during the data-transfer operation.

In step S308, the data-transfer operation is performed. Upon completion of the data-transfer operation, the polling circuit 1136 is enabled continue monitoring the slave data synchronization signal 12 generated by the sensing device 120 (step S304).

Figure 3B:
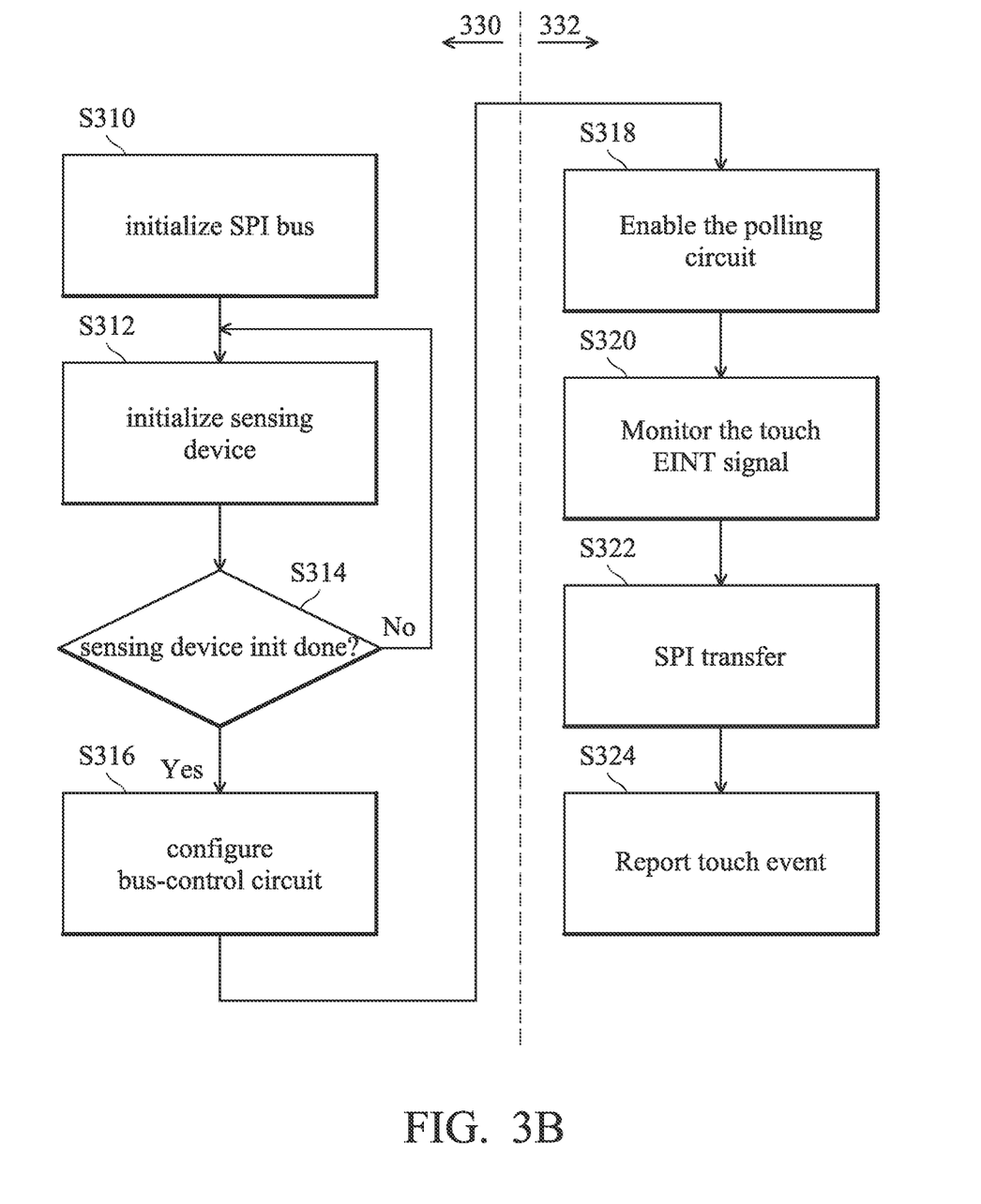
FIG. 3B is a flow chart of the software workflow of a touch operation in accordance with an embodiment of the invention.

FIG. 3B is a flow chart of the software workflow of a touch operation in accordance with an embodiment of the invention. Please refer to FIG. 1, FIG. 2A, and FIG. 3B. The flow of FIG. 3B may refer to the touch-detection initialization procedure of the components in the electronic device 100, where the left portion 330 may be regarded as a touch-initialization stage, and the right portion 332 may be regarded as a touch-event reporting stage or a hardware-enhanced stage.

In step S310, the bus interface is initialized. For example, when the electronic device 100 is booted up, the bus interface (e.g., SPI interface, including the SPI master and SPI slave) is initialized.

In step S312, the sensing device 120 is initialized. For example, the bus-control circuit 1131 may transmit some test signals to the sensing device 120 to ensure that the sensing device 120 can work normally.

In step S314, it is determined whether the sensing device initialization is done. If it is determined that the sensing device initialization is done, step S316 is performed. If it is determined that the sensing device initialization is not done yet, the flow goes back to step S312.

In step S316, the bus-control circuit 1131 is configured. The details of step S316 can be referred to step S302 in the embodiment of FIG. 3A.

In step S318, the polling circuit 1136 is enabled. In step S320, the polling circuit 1136 monitors the touch EINT signal. In step S322, the data-transfer operation is performed. The details of steps S318 to S322 can be refer to steps S304 to S308 in the embodiment of FIG. 3A.

In step S324, the touch event is reported. For example, after the bus-control circuit 1131 has completed the data-transfer operation, the bus-control circuit 1131 may generate an interrupt request (IRQ) signal, and send the IRQ signal to the general interrupt controller 112. Then, the general interrupt controller 112 may transmit the IRQ signal to the processing unit 111, and the processing unit 111 may know the interrupt event from the bus master 113 so as to report the touch event to the application running on the processing unit 111. Thus, the application running on the processing unit 111 may perform an operation corresponding to the touch event.

Specifically, during the touch-initialization stage (i.e., portion 330), the processing unit 111, the bus-control circuit 1131, and the sensing device 120 have to ensure the touch-detection operations can work normally, and the bus-control circuit 1131 may be in a normal configuration. During the touch-even report stage (i.e., portion 332), the bus-control circuit 1131 have been configured to fetch tasks from the task queue 131, and the bus-control circuit 1131 is capable of automatically initiating data-transfer operations in response to the touch EINT signal being asserted, where the processing unit 111 (i.e., software) is not involved in the data-transfer operation initiated by the bus-control circuit 1131.

Figure 3C:
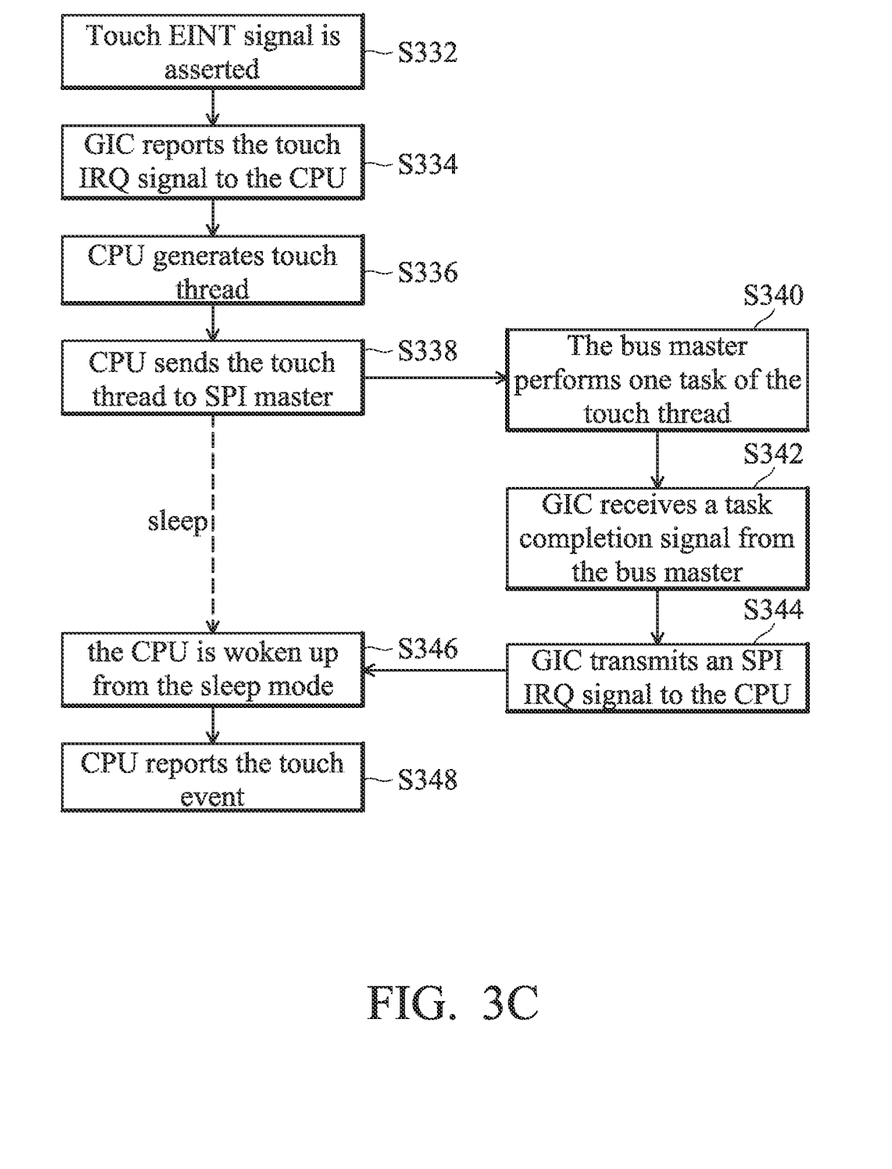
FIG. 3C is a flow chart of reporting a touch event by the processing unit in accordance with an embodiment of the invention.

FIG. 3C is a flow chart of reporting a touch event by the processing unit in accordance with an embodiment of the invention. Please refer to FIG. 1, FIG. 2A and FIG. 3C.

In step S332, a touch EINT signal is detected by the bus master 113. For example, in this case, it is assumed that the polling circuit 1136 is disabled.

In step S334, the general interrupt controller 112 reports a touch interrupt request signal to the processing unit 111. Details of how the general interrupt controller 112 reports the touch interrupt request signal can be referred to the aforementioned embodiments.

In step S336, the processing unit 111 generates a touch thread in response to the touch interrupt signal. For example, the touch thread may include a plurality of tasks to send data to the sensing device 120 and to read sensor data from the sensing device 120.

In step S338, the processing unit 111 sends the touch thread to the bus master 113. For example, after the processing unit 111 has sent the touch thread to the bus master 113, the processing unit 111 will enter a sleep mode to save power.

In step S340, the bus master 113 performs one task of the touch thread. For example, the bus master 113 may perform one or more data-transfer operations of the task to send data to the sensing device 120, and to read sensor data from the sensing device 120. Upon completion of the data-transfer operations of the task, the bus master 113 may transmit a task-completion signal of the task to the general interrupt controller 112.

In step S342, the general interrupt controller 112 receives a task-completion signal of the task from the bus master 113.

In step S344, the general interrupt controller 112 transmits an SPI IRQ signal to the processing unit 111. Because the processing unit 111 is in the sleep mode, the general interrupt controller 112 can use the SPI IRQ signal to awaken the processing unit 111.

In step S346, the processing unit 111 is woken up from the sleep mode to a work mode.

In step S348, the processing unit 111 reports the touch event. For example, the processing unit 111 may report the touch event to the application running on the processing unit 111. Thus, the application running on the processing unit 111 may perform an operation corresponding to the touch event.

It should be noted that in the flow of FIG. 3C, steps S336, S338, S344, S346, and S348 are performed by software (e.g., processing unit 111) while steps S332, S334, S340, and S342 are performed by hardware (e.g., bus master 113 and GIC 112).

Figure 3D:
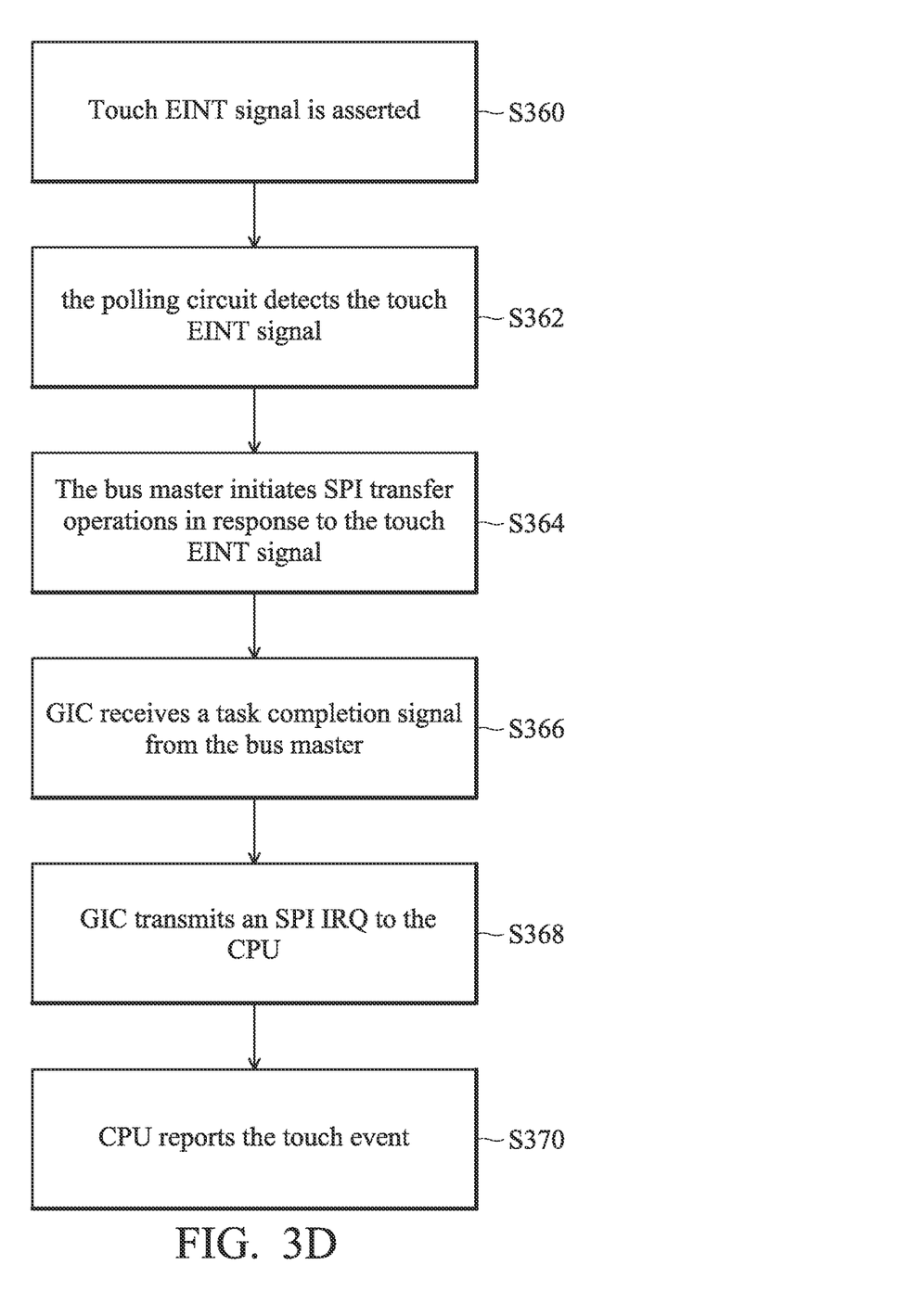
FIG. 3D is a flow chart of reporting a touch event by the processing unit in accordance with another embodiment of the invention.

FIG. 3D is a flow chart of reporting a touch event by the processing unit in accordance with another embodiment of the invention. Please refer to FIG. 1, FIG. 2A and FIG. 3D.

The difference between FIG. 3C and FIG. 3D is that the polling circuit 1136 of the bus master 113 (i.e., a hardware circuit) detects the touch EINT signal generated by the sensing device (step S362), and the bus-control circuit 1131 automatically initiates SPI transfer operations in response to the detected touch EINT signal (step S364), such as automatically fetching tasks from the task queue 131 in sequence and performing the fetched tasks. Thus, the flow in FIG. 3C can be regarded as a legacy touch-event reporting flow when the hardware functions (i.e., polling and data transferring) of the bus master 113 are disabled, and the flow in FIG. 3D can be regarded as a hardware-enhanced touch-event reporting flow when the hardware functions of the bus master 113 are enabled.

Figure 4A:
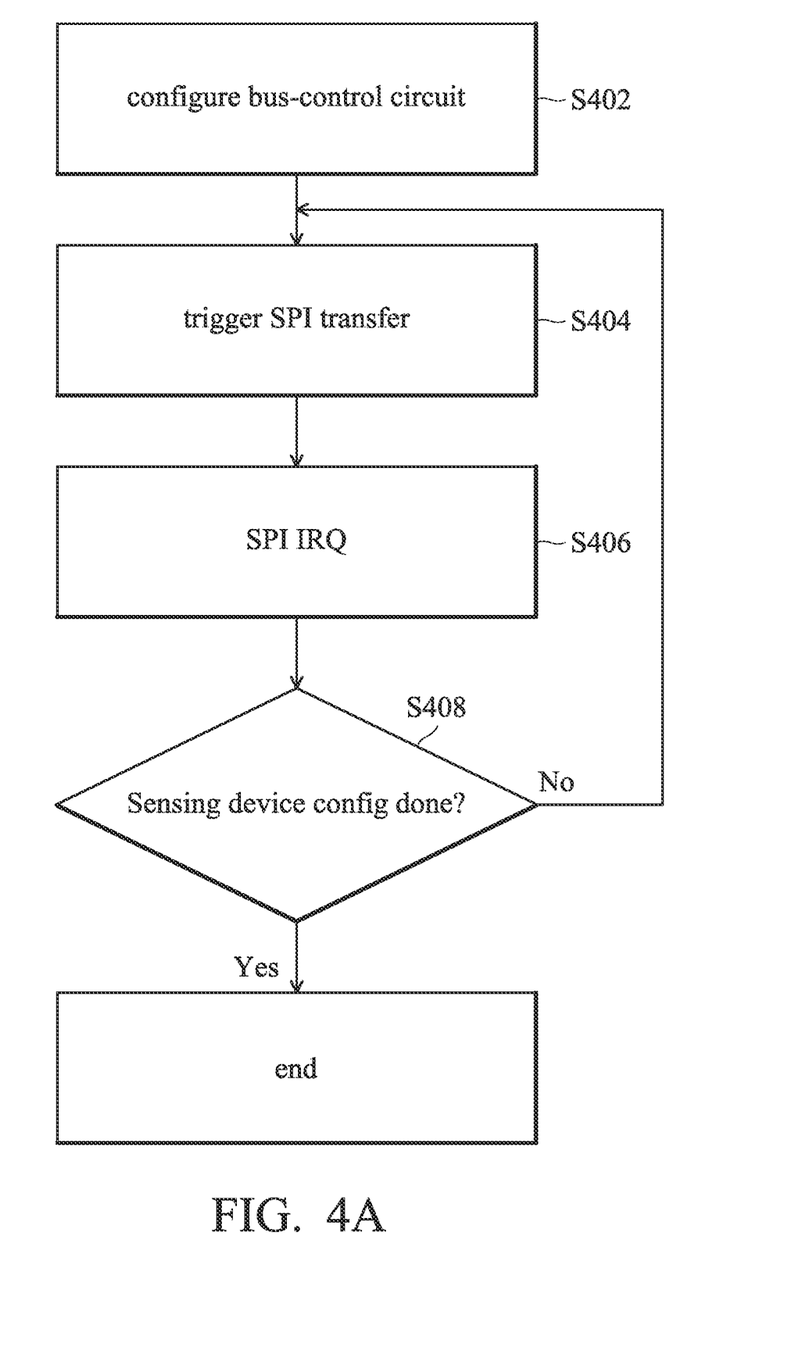
FIG. 4A is a flow chart of a configuration process of the sensing device in accordance with an embodiment of the invention.

FIG. 4A is a flow chart of a configuration process of the sensing device in accordance with an embodiment of the invention. Please refer to FIG. 1, FIG. 2A, and FIG. 4A.

In step S402, the bus-control circuit 1131 is configured. The details of step S316 and step S402 can be referred to step S302 in the embodiment of FIG. 3A.

In step S404, a data-transfer operation is triggered. For example, the processing unit 111 may transmit the required data of one task to the bus-control circuit 1131, and the bus-control circuit 1131 may transmit the data of this task to the sensing device 120 over bus 11.

In step S406, the bus-control circuit 1131 informs the GIC 120 to send an SPI IRQ signal to the processing unit 111. For example, upon completion of the data-transfer operation of the task, the bus-control circuit 1131 may send a task-completion signal of the task to the GIC 120, and the GIC 120 may then generate the SPI IRQ signal in response to the task-completion signal, and transmit the generated SPI IRQ signal to the processing unit 111.

In step S408, it is determined whether the configuration process of the sensing device 120 is done. If it is determined that the configuration process of the sensing device 120 is done, the flow ends. If it is determined that the configuration process of the sensing device 120 is not done yet, the flow goes back to step S404.

It should be noted that when the data-transfer operation of one task is required, the processing unit 111 has to be interrupted once to send the required data to the bus-control circuit 1131, so the bus-control circuit 1131 can transmit the required data of this task to the sensing device 120 over bus 11. However, the configuration process of the sensing device 120 may require a plurality of tasks, and the processing unit 111 may be interrupted once to perform the aforementioned steps of one task in FIG. 4A until all tasks in the configuration process is done.

Figure 4B:
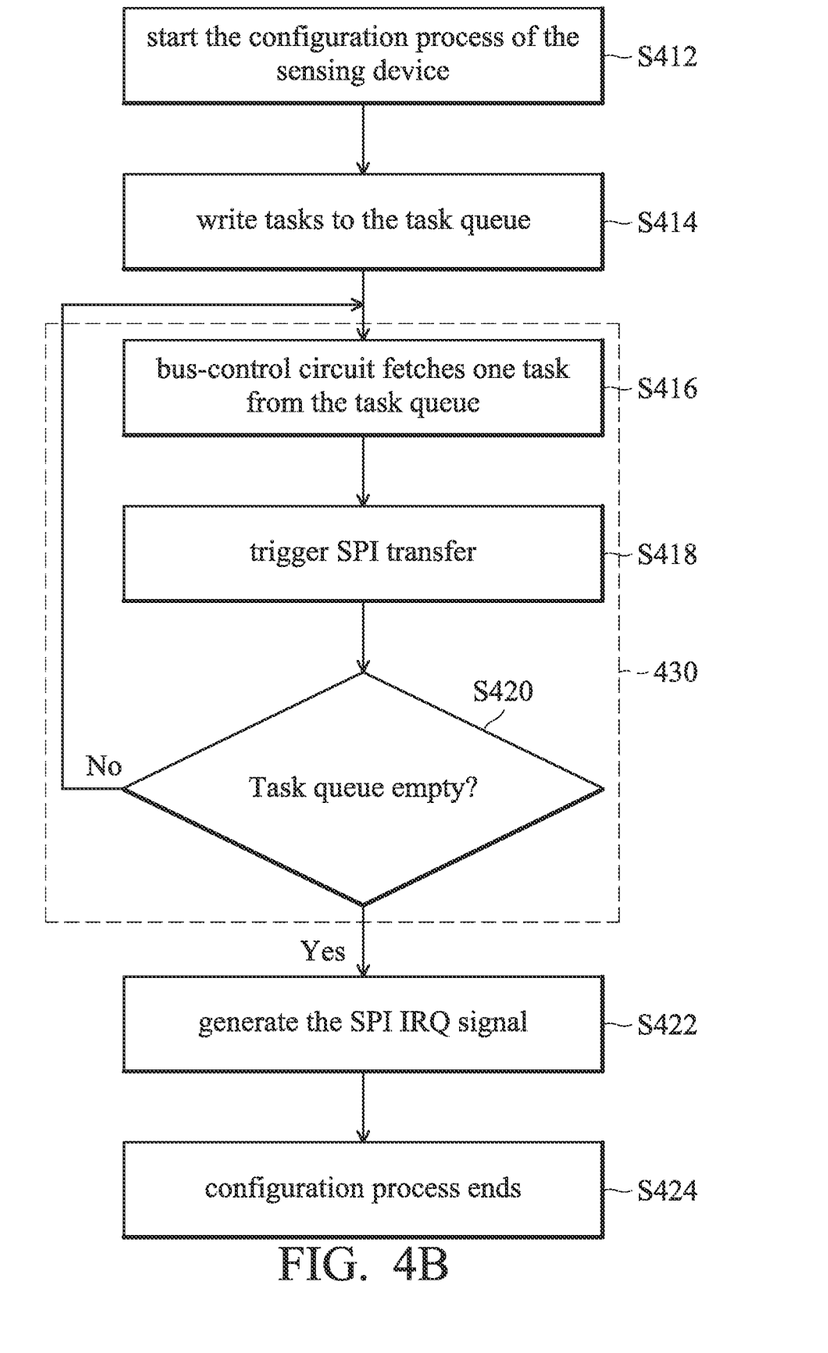
FIG. 4B is a flow chart of a configuration process of the sensing device in accordance with another embodiment of the invention.

FIG. 4B is a flow chart of a configuration process of the sensing device in accordance with another embodiment of the invention. Please refer to FIG. 1, FIG. 2A, and FIG. 4B.

In step S412, the configuration process of the sensing device 120 is started.

In step S414, the processing unit 111 writes tasks to the task queue 131. For example, the configuration process of the sensing device 120 may include a plurality of tasks, and the processing unit 111 can write these tasks in the task queue 131 at once before the bus-control circuit 1131 performs these tasks.

In step S416, the bus-control circuit 1131 fetches one task from the task queue. For example, bus-control circuit 1131 may fetch one task from the task queue at one time if the task queue is not empty.

In step S418, a data-transfer operation of the task is triggered. For example, the processing unit 111 may transmit the required data of one task to the bus-control circuit 1131, and the bus-control circuit 1131 may transmit the data of this task to the sensing device 120 over bus 11.

In step S420, it is determined whether the task queue 131 is empty. If it is determined that the task queue 131 is empty, step S422 is performed. If it is determined that the task queue 131 is not empty, the flow goes back go step S416. For example, the bus-control circuit 1131 may detect the storage status of the task queue 131 according to the values stored in the registers 141 and 143. The bus-control circuit 1131 may calculate the number of tasks that have been executed using a specific register in registers 1134, such as increasing the value of the specific register by 1 each time the bus-control circuit 1131 has completed one task. When the value of the specific register has reached the HW task count stored in the register 141, the bus-control circuit 1131 may know that the task queue 131 is empty. It should be noted that the steps S416, S418, and S420 in block 430 may be referred to a cycle for performing a task.

In step S422, the bus-control circuit 1131 informs the GIC 120 to send an SPI IRQ signal to the processing unit 111. For example, upon completion of the data-transfer operations of all tasks of the configuration process, the bus-control circuit 1131 may send a task-completion signal of the task to the GIC 120, and the GIC 120 may then generate the SPI IRQ signal in response to the task-completion signal, and transmit the generated SPI IRQ signal to the processing unit 111.

In step S424, the configuration process ends. It should be noted that although the configuration process of the sensing device 120 may require a plurality of tasks, the processing unit 111 in the flow of FIG. 4B is interrupted once after all tasks of the configuration process are completed. In comparison with the flow in FIG. 4A, the flow in FIG. 4B can change multiple interrupts to one interrupt during the configuration process of the sensing device 120, thereby reducing loading of the processing unit 111 and improving the performance of the processing unit 111. It should be noted that the touch events in the aforementioned embodiment can be referred to as sensor events if the sensing device is a device other than a touch screen or a touch-detection device. In addition, bus 11 can be implemented by another bus other than the SPI bus.

In view of the above, an integrated circuit and an interrupt-handling method of a sensing device are provided, which are capable of detecting interrupt signals from the sensing device using a hardware polling circuit, and fetching tasks stored in the task queue in sequence and performing data-transfer operations of each task by the bus-control circuit to obtain sensor data from one or more sensors of the sensing device. Upon completion of all tasks in the task queue, the bus-control circuit will inform the general interrupt controller to send an interrupt request signal to the processing unit, so the processing unit is interrupted to fetch sensor data obtained from the sensing device to report sensor events to applications running on the processing unit. Thus, loading of the processing unit can be reduced and the performance of the processing unit can be improved.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated circuit, comprising:
a processor;
a general interrupt controller; and
a bus master, connected to a sensing device which comprises one or more sensors, wherein the bus master comprises:
a bus-control circuit;
a polling circuit configured to detect whether an interrupt signal of the sensing device is asserted;
wherein in response to the polling circuit detecting that the interrupt signal is asserted, the bus-control circuits fetches each task of a plurality of tasks stored in a task queue of a memory in sequence, and performs one or more data-transfer operations corresponding to each task to obtain sensor data detected by the one or more sensors from the sensing device,
wherein in response to a task-completion signal of the tasks generated by the bus-control circuit, the general interrupt controller generates an interrupt request signal which is transmitted to the processor,
wherein in response to the interrupt request signal, the processor reports a sensor event using the sensor data obtained by the data-transfer operations corresponding to each task.

2. The integrated circuit as claimed in claim 1, wherein when the bus-control circuit is performing the data-transfer operations corresponding to each task, the polling circuit is disabled.

3. The integrated circuit as claimed in claim 2, wherein the polling circuit is enabled in response to the task-completion signal.

4. The integrated circuit as claimed in claim 3, wherein the bus master further comprises a DMA (direct memory access) controller configured to fetch each task from the memory.

5. The integrated circuit as claimed in claim 4, wherein the bus master further comprises a first register and a second register, wherein a first value stored in the first register represents a hardware task count, and a second value stored in the second register represents a base physical address of the task queue.

6. The integrated circuit as claimed in claim 5, wherein the bus master further comprises a third register and a fourth register, wherein the processor writes the tasks in the task queue and writes the first value of the first register and second value of the second register when the integrated circuit is booted up, and sets a third value of the third register to 1 when the processor has completed writing,
wherein in response to the third value of the third register being set to 1, the bus-control circuit starts to fetch the tasks from the task queue in sequence using the first value of the first register and the second value of the second register,
wherein a fourth value stored in the fourth register is used to enable or disable hardware functions of polling and data transferring of the bus master.

7. The integrated circuit as claimed in claim 6, wherein in response to the task queue being empty, the bus-controller circuit writes the third value of the third register to 0, and the processor starts to write new tasks to the task queue in response to the third value of the third register being set to 0.

8. The device as claimed in claim 1, wherein the processor reports the sensor event to an application running on the processor, and the application executes one or more operations corresponding to the reported sensor event.

9. The device as claimed in claim 1, wherein the bus-control circuit is connected to the sensing device through a SPI (serial peripheral interface) bus, an I2C (inter-integrated circuit) bus, or an I3C bus.

10. An interrupt-handling method of a sensing device, for use in an integrated circuit, wherein the integrated circuit comprises a processor, a general interrupt controller, and a bus master, and the bus master comprises a bus-control circuit and a polling circuit, the method comprising:
utilizing the polling circuit to detect whether an interrupt signal of the sensing device is asserted;
in response to the polling circuit detecting that the interrupt signal is asserted, utilizing the bus-control circuit to fetch each task of a plurality of tasks stored in a memory in sequence, and to perform one or more data-transfer operations corresponding to each task to obtain sensor data detected by one or more sensors from the sensing device;
in response to a task-completion signal of the tasks generated by the bus-control circuit, utilizing the general interrupt controller to transmit an interrupt request signal to the processor;
in response to the interrupt request signal, utilizing the processor to report a sensor event using the sensor data obtained by the data-transfer operations corresponding to each task.

11. The method as claimed in claim 10, further comprising: disabling the polling circuit when the bus-control circuit is performing the data-transfer operations corresponding to each task.

12. The method as claimed in claim 11, further comprising: enabling the polling circuit in response to the task-completion signal.

13. The method as claimed in claim 12, wherein the bus master further comprises a DMA (direct memory access) controller, configured to fetch each task from the memory.

14. The method as claimed in claim 13, wherein bus master further comprises a first register and a second register, wherein a first value stored in the first register represents a hardware task count, and a second value stored in the second register represents a base physical address of the task queue.

15. The method as claimed in claim 14, wherein the bus master further comprises a third register and a fourth register, and the method further comprises:
utilizing the processor to write the tasks in the task queue and to write the first value of the first register and second value of the second register when the integrated circuit is booted up;
setting a third value of the third register to 1 when the processor has completed writing; and
in response to the third value of the third register being set to 1, utilizing the bus-control circuit to start to fetch the tasks from the task queue in sequence using the first value of the first register and the second value of the second register,
wherein a fourth value stored in the fourth register is used to enable or disable hardware functions of polling and data transferring of the bus master.

16. The method as claimed in claim 15, further comprising:
in response to the task queue being empty, utilizing the bus-controller circuit to write the third value of the third register to 0; and utilizing the processor to start to write new tasks to the task queue in response to the third value of the third register being set to 0.

17. The method as claimed in claim 10, wherein an application is running on the processor, and method further comprises:
 utilizing the processor to report the sensor event to the application; and
 utilizing the application to execute one or more operations corresponding to the reported sensor event.

18. The method as claimed in claim 10, wherein the bus-control circuit is connected to the sensing device through a SPI (serial peripheral interface) bus, an I2C (inter-integrated circuit) bus, or an I3C bus.

* * * * *